Figures 1, 2:
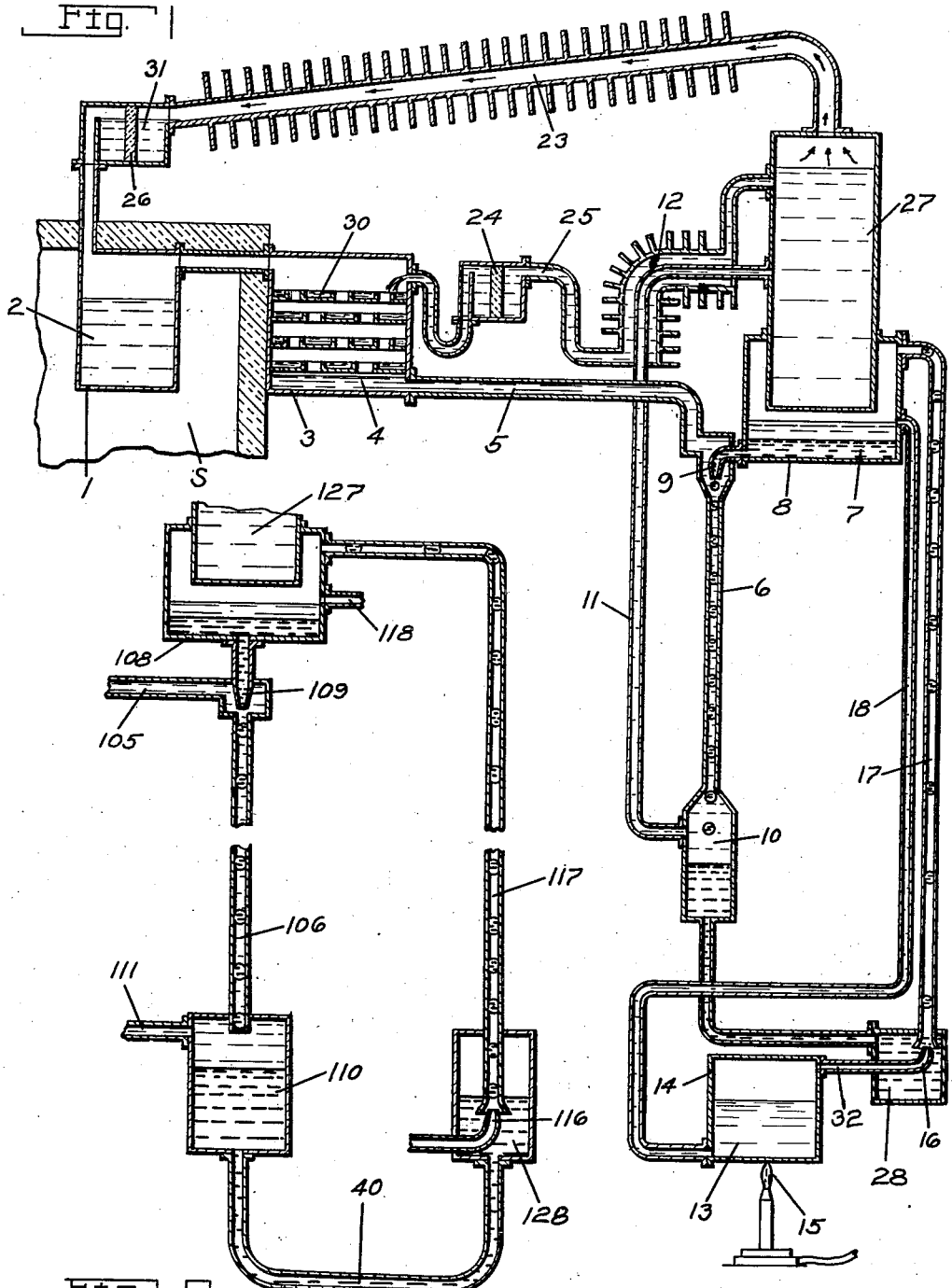

Aug. 15, 1939.  K. P. BRACE  2,169,459
REFRIGERATOR SYSTEM
Filed Nov. 5, 1936

INVENTOR.
KEMPER P. BRACE
BY McConkey & Booth
ATTORNEYS.

Patented Aug. 15, 1939

2,169,459

UNITED STATES PATENT OFFICE 2,169,459

REFRIGERATOR SYSTEM

Kemper P. Brace, South Bend, Ind., assignor to International Engineering Corporation, Chicago, Ill., a corporation of Illinois Application November 5, 1936, Serial No. 109,267

5 Claims. (Cl. 62—119)

This invention relates to refrigeration, and is illustrated as embodied in a heat-operated apparatus of the evaporative type.

An object of the invention is to eliminate mechanical moving parts, and to simplify apparatus of this type by combining the circulating means with the means for reconcentrating the absorbent.

I prefer to cause the desired circulation of the absorbent by a mercury pump, itself of novel construction, the mercury in the pump being circulated by forming a heavy vapor which lifts the mercury from a lower to a higher level, and which vapor is in the illustrated apparatus condensed in juxtaposition to a concentrator to heat the absorbent therein and drive off part of the refrigerant as a vapor.

Another feature of the invention relates to preventing passage of vapor back to either the evaporator or the absorber, from the concentrator, by utilizing porous membranes which permit the passage of liquid but which will not pass vapor.

Other objects and features of the invention, including various novel combinations and arrangements, will be apparent from the following description of the illustrative embodiment shown in the accompanying drawing, in which:

Figure 1 is a diagrammatic sectional view of one embodiment of the invention; and Figure 2 is a similar view of part of the connections of Figure 1, in a modified arrangement.

In the arrangement of Figure 1, there is provided an evaporator 1, constituting the cooling element of the system and shown by way of illustration as arranged in a space "S" to be cooled. The evaporator 1 contains a refrigerant 2, such as ammonia, in a liquid state. Connected to the evaporator 1 is an absorber 3 containing an absorbing liquid 4 in which the refrigerant 2 is highly soluble and which is of such a nature that the vapor pressure of the dissolved refrigerant above the solution 4 is considerably less than the vapor pressure of the pure refrigerant 2 at the same temperature. With ammonia as the refrigerant, such a solvent is a dilute solution of ammonia in water.

By virtue of the difference in vapor pressure above 2 and above 4, there is a flow of refrigerant vapor from 1 to 3, and in 3 there is a condensation and absorption of this vapor in the absorbing solution 4. The evaporation in 1 lowers the temperature of the liquid 2, on account of the latent heat of evaporation which is taken up by the vapor, giving the desired cooling effect at that point. As the vapor condenses and is absorbed by the solution 4, this latent heat is liberated again and the temperature at that point rises, while the proportion of refrigerant in the solution 4 rises.

In order to have the process operate continuously, heat must continuously be removed from the absorbent 4 at a rate equal to the addition of heat thereto by the absorbed refrigerant, while also the solution 4 must continuously be reconcentrated to remove therefrom an amount of refrigerant equal to that condensed therein as described above.

In order to reconcentrate the absorbent, it is necessary to force some of it against a pressure head to a concentrating means, allowing the concentrated absorbent to flow back into the condenser 3. I prefer to use for this purpose a device having no moving mechanical parts, without the disadvantages involved in balancing pressures by an inert gas or the like, and therefore illustrate the use of a fluid-piston type of pump.

In the arrangement illustrated, absorbent 4 flows through a conduit 5 to a vertical tube 6. Mercury 7 from a reservoir 8 also flows into the tube 6 through a nozzle 9, the rate of flow being such that separated drops of mercury are formed at the nozzle 9. Thus the flow downwardly through the tube 6 consists of alternate drops of absorbent and mercury, the proportion being adjustable by varying the effective size of the nozzle 9.

The mercury is separated from the absorbent in a separating chamber 10, the absorbent being under sufficient pressure to force it into a concentrator 27. This pressure is substantially equal to the head of mercury in the tube 6, i. e. to the total weight of the mercury drops in that tube. If tube 6 is 60 inches long and contains 90% mercury and 10% absorbent, the upward pressure in tube 11 is 54 inches of mercury or about 25 lbs. per square inch.

The absorbent in the tube 11 passes through a heat exchanger 12, shown as enveloping a portion of tube 11, into the concentrator 5, where it is heated to boil off part of the refrigerant.

A third liquid 13, preferably a relatively heavy liquid boiling below the boiling point of mercury, such as bromoform (CHBr$_3$), carbon tetrabromide (CBr$_4$), di-iodo-ethane (CH$_2$CHI$_2$), or tetrabromo-ethane (CH$_2$BrCBr$_3$), in a boiler 14 is vaporized by suitable heating means such as a gas burner 15. The vapor so formed is conducted through a pipe 32 to a nozzle 16, forming in effect an injector, which liberates it below the level of mercury in a reservoir 28 into a vertical lift tube

17. The flow of vapor through the nozzle 16 is so adjusted that the flow through the tube 17 consists of a mixture of vapor and liquid mercury, the exact proportion depending on the rate of flow of vapor through the nozzle.

The pressure in the boiler 14 must be substantially equal to the head of mercury in tube 17 (i. e. to the total weight of the mercury drops in tube 17). It is found in practice that the lift of the vapor will pump a substantial amount of mercury to a height of ten times the pressure (in inches of mercury) in the boiler 13. If it is necessary to lift the mercury 60 inches, for example, a pressure of 6 inches of mercury must be maintained in the boiler 14. If the specific gravity of the liquid 13 is 3, the hydrostatic head in a tube 18 returning the liquid 13 to the boiler must be kept, therefore, in this instance at 26 inches.

According to one feature of my invention, this vapor, after carrying the mercury up the tube 17 into the reservoir 8 above the drop tube 6, condenses above the mercury in the reservoir 8, at the same time giving up its heat of liquefaction to the absorbent in the concentrator 27, causing part of the refrigerant to be distilled off therefrom into a condenser tube 23. The liquid condensed from the vapor flows back through the conduit 18 to the bottom of the boiler 14. Instead of using the liquid 13, the mercury itself may be heated and caused to flow up the conduit 17 by a percolating action.

The system being described is a closed system, with all air and other foreign gases removed, and the pressure existing in each of its various parts is therefore at all times equal to the vapor pressure of the lowest boiling component in that part of the system. For example, if ammonia is used as the refrigerant and an aqueous solution of ammonia is used as the absorbent, and if the temperature in 1 is +15° F., and the temperature in 23 is +100° F., the vapor pressure in evaporator 1 will be +43 lbs. per square inch (absolute), and the pressure in condenser 23 will be +210 lbs. per square inch (absolute), the pressure difference being 167 lbs. per square inch.

If on the other hand a refrigerant having a relatively high boiling point, such as ether, is used the evaporator pressure at the temperature specified above would be +2.2 lbs. per square inch (absolute), and the pressure in the condenser 23 would be +16 lbs. per square inch (absolute), the difference being 13.8 lbs. per square inch, or approximately 27 inches of mercury.

The higher the boiling point of the refrigerant the lower will be the pressure difference between the absorber and the condenser. By choosing the proper refrigerant and an absorber to correspond, the maximum operating pressure difference may be predetermined. Various other desirable combinations of refrigerants and absorbents which may be used in my novel system are described more fully in application No. 109,313, filed concurrently herewith by Frank J. Sowa.

Another feature of the invention relates to returning concentrated absorbent from the concentrator 27 to the absorber 3 without the passage of any vapor (which might cause a "lock" and stop the circulation of the entire system) without using float valves or other mechanical moving parts, and similarly to allow flow to the evaporator 1 of liquid refrigerant condensed in the condenser 23 without the passage of any vapor.

To this end I employ capillary vapor traps in the form of porous walls or membranes 24, in the conduit 25 returning concentrated absorbent from the concentrator 27 to the absorber 3, and 26, between the condenser 23 and the evaporator 1. These membranes are very finely porous, and allow flow of liquid but unless a relatively high critical pressure is exceeded they will not pass any vapor.

The membrane 24 allows the condensed absorbent to flow down over a series of baffle pans 30 into the absorber 3, thus completing the cycle of the absorbent.

The membrane 26 is arranged in a trap 31, from which liquid refrigerant overflows into the evaporator 1. This completes the cycle of the refrigerant.

In the arrangement of Figure 2, a slightly different form of mercury pump is used. In this arrangement, mercury is conveyed from the separator 110 to the reservoir 128 through a U-tube 40. This insures that there will always be an effective seal to make certain that no absorbent liquid will ever reach the reservoir 128. The other parts of the system are similar to those of Figure 1, and are indicated by the same reference characters increased by 100.

It will be noted that the fluids used in my system must have the following characteristics: The refrigerant must be soluble in the absorber, and must be driven off therefrom by heat. The absorbent must not be miscible with mercury. The refrigerant must be driven off (at least partially) from the absorbent at a temperature substantially below the boiling point of the absorbent. The liquid 13 must have a boiling point high enough so that its condensation in the reservoir 8 will liberate enough heat to raise the temperature of the absorbent in the concentrator 27 high enough to drive off the refrigerant as a vapor, without susbtantial vaporization of the absorbent.

While an illustrative arrangement has been described in detail, it is not my intention to limit the scope of the invention to that particular arrangement, or otherwise than by the terms of the appended claims.

I claim:

1. A refrigeration system having a refrigerant evaporator and an absorber containing an absorbent dissolving refrigerant carried over as vapor from the evaporator, a concentrator connected to return substantially pure refrigerant to the evaporator and reconcentrated absorbent to the absorber, a mercury pump for forcing absorbent from the absorber to the concentrator, said pump comprising upper and lower mercury reservoirs connected by a vertical tube through which drops of mercury descend to cause circulation of the absorbent, and means for raising the mercury from the lower to the upper reservoir comprising a boiler containing a heating liquid and means for heating the liquid therein to vaporize it, a lift tube through which the vapor so formed ascends from below the level of the mercury in the lower reservoir, and which discharges mercury in the upper reservoir, and means for condensing said vapor in juxtaposition to the concentrator to heat the absorbent therein.

2. An evaporative type refrigeration system having means for reconcentrating absorbent, in combination with a mercury pump for circulating absorbent, said pump comprising upper and lower mercury reservoirs connected by a vertical tube through which drops of mercury descend to cause the circulation of the absorbent, and means for raising the mercury from the lower to the upper reservoir comprising a boiler containing a heating liquid and means for heating the liquid therein to vaporize it, a lift tube through which the vapor so formed ascends from below the level of the mercury in the lower reservoir, and which discharges mercury in the upper reservoir, and means for condensing said vapor in juxtaposition to the reconcentrating means to heat the absorbent therein.

3. A refrigerator system comprising means for evaporating a refrigerant, means for absorbing vapor formed thereby, heat-operated means for reconcentrating absorbent and supplying absorbent to the absorber and refrigerant to the evaporator, a mercury pump connected to circulate absorbent from the absorber to the reconcentrating means, means for vaporizing a liquid and causing the vapor so formed to circulate the mercury in said pump, and means for condensing said vapor and simultaneously heating the reconcentrating means by transferring thereto the heat of liquefaction of the vapor as well as part of the heat contained in said vapor.

4. A pump mechanism for use in a refrigeration apparatus or the like comprising upper and lower reservoirs of mercury, a vertical drop tube having at its upper end an inlet for fluid to be pumped, an inlet jet from the upper reservoir opening into the upper end of the drop tube, a separation chamber at the bottom of the drop tube having in its upper portion an outlet for the fluid being pumped, a downwardly-bent U-tube connecting the bottom of the separation chamber with the bottom of the lower reservoir and forming a trap preventing the pumped fluid from entering the lower reservoir, a boiler containing a liquid selected from the group including bromoform and carbon tetrabromide and di-iodo-ethane and tetra-bromo-ethane, means for heating the liquid in the boiler, means for delivering the vapor formed by heating said liquid in the lower reservoir below the level of the mercury therein, a vertical tube into which said vapor with entrained mercury ascends into the upper reservoir, and means for returning condensed vapor from the upper reservoir to said boiler.

5. A pump mechanism for use in a refrigeration apparatus or the like comprising upper and lower reservoirs of mercury, a vertical drop tube having at its upper end an inlet for fluid to be pumped, an inlet jet from the upper reservoir opening into the upper end of the drop tube, a separation chamber at the bottom of the drop tube having in its upper portion an outlet for the fluid being pumped, a downwardly-bent U-tube connecting the bottom of the separation chamber with the bottom of the lower reservoir and forming a trap preventing the pumped fluid from entering the lower reservoir, a boiler containing a relatively heavy liquid having a boiling point below that of mercury, means for heating the liquid in the boiler, means for delivering the vapor formed by heating said liquid in the lower reservoir below the level of the mercury therein, a vertical tube into which said vapor with entrained mercury ascends into the upper reservoir, and means for returning condensed vapor from the upper reservoir to said boiler.

KEMPER P. BRACE.